United States Patent
Lim et al.

(10) Patent No.: US 7,729,803 B2
(45) Date of Patent: Jun. 1, 2010

(54) SYSTEM AND METHOD FOR RETURNING ROBOT CLEANER TO CHARGER

(75) Inventors: Kwang-soo Lim, Seoul (KR); Sam-jong Jeung, Gwangju (KR); Jeong-gon Song, Gwangju (KR); Ju-sang Lee, Gwangju (KR); Jang-youn Ko, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 877 days.

(21) Appl. No.: 11/486,284

(22) Filed: Jul. 14, 2006

(65) Prior Publication Data
US 2007/0050086 A1    Mar. 1, 2007

(30) Foreign Application Priority Data
Aug. 31, 2005    (KR) .................... 10-2005-0080977

(51) Int. Cl.
*G06F 19/00*    (2006.01)
(52) U.S. Cl. .............. 700/245; 700/218; 180/167; 180/169; 318/568.11; 318/568.12; 318/568.2; 320/109
(58) Field of Classification Search ............ 318/568.11, 318/568.12, 568.2; 320/109; 700/245, 218
See application file for complete search history.

(56) References Cited

U.S. PATENT DOCUMENTS

| | | | | |
|---|---|---|---|---|
| 4,679,152 A | * | 7/1987 | Perdue | 701/23 |
| 4,777,416 A | * | 10/1988 | George et al. | 318/568.12 |
| 4,835,692 A | * | 5/1989 | Pudney et al. | 701/2 |
| 4,892,701 A | * | 1/1990 | Mauvieux et al. | 376/258 |
| 5,440,216 A | * | 8/1995 | Kim | 318/587 |
| 5,534,762 A | * | 7/1996 | Kim | 318/568.12 |
| 5,568,589 A | * | 10/1996 | Hwang | 706/52 |
| 5,787,545 A | * | 8/1998 | Colens | 15/319 |
| 5,926,909 A | | 7/1999 | McGee | |
| 6,278,917 B1 | * | 8/2001 | Bauer et al. | 701/23 |
| 6,389,329 B1 | * | 5/2002 | Colens | 700/262 |
| 6,459,955 B1 | * | 10/2002 | Bartsch et al. | 700/245 |
| 6,496,755 B2 | * | 12/2002 | Wallach et al. | 700/245 |
| 6,690,134 B1 | * | 2/2004 | Jones et al. | 318/567 |

(Continued)

FOREIGN PATENT DOCUMENTS

CN    1530781 A    9/2004

(Continued)

*Primary Examiner*—Dalena Tran
*Assistant Examiner*—Kyung J Kim
(74) *Attorney, Agent, or Firm*—Blank Rome LLP (57) ABSTRACT

A system for returning a robot to a charger includes: a homing signal transmitter, including at least first, second, and third signal transmitters, each adapted to be provided at a front side of the charger and to respectively transmit signals which are different from each other in at least one of a code and a transmission distance, and a fourth signal transmitter, adapted to be provided on at least one lateral side of the charger and to transmit a signal which is different from the signals of the first, second, and third transmitters in code; a homing signal receiver provided at the robot and to receive at least one signal transmitted from the homing signal transmitter; and a controller adapted to identify the at least one signal and to control the robot to return to the charger based at least in part on the at least one signal.

17 Claims, 12 Drawing Sheets

U.S. PATENT DOCUMENTS

| | | | |
|---|---|---|---|
| 6,859,010 B2* | 2/2005 | Jeon et al. | 320/109 |
| 6,977,618 B1* | 12/2005 | Hanewinkel et al. | 343/705 |
| 7,031,805 B2 | 4/2006 | Lee et al. | |
| 7,053,578 B2* | 5/2006 | Diehl et al. | 318/568.12 |
| 7,196,487 B2* | 3/2007 | Jones et al. | 318/567 |
| 7,332,890 B2* | 2/2008 | Cohen et al. | 320/109 |
| 7,343,221 B2* | 3/2008 | Ann | 700/245 |
| 7,489,985 B2* | 2/2009 | Ko et al. | 700/259 |
| 2002/0041176 A1* | 4/2002 | Eki | 320/109 |
| 2002/0052671 A1 | 5/2002 | Carpenter | |
| 2002/0120364 A1* | 8/2002 | Colens | 700/262 |
| 2003/0060928 A1* | 3/2003 | Abramson et al. | 700/245 |
| 2004/0158357 A1 | 8/2004 | Lee et al. | |
| 2005/0010330 A1* | 1/2005 | Abramson et al. | 700/245 |
| 2005/0067994 A1* | 3/2005 | Jones et al. | 318/568.12 |
| 2005/0150074 A1* | 7/2005 | Diehl et al. | 15/327.5 |
| 2005/0156562 A1* | 7/2005 | Cohen et al. | 320/107 |
| 2005/0168345 A1* | 8/2005 | Swafford et al. | 340/686.1 |
| 2006/0087273 A1 | 4/2006 | Ko et al. | |
| 2007/0050086 A1* | 3/2007 | Lim et al. | 700/245 |
| 2008/0105185 A1* | 5/2008 | Kuhlman | 114/249 |

FOREIGN PATENT DOCUMENTS

| | | |
|---|---|---|
| EP | 1457151 A2 | 9/2004 |
| GB | 2178881 A | 2/1987 |
| GB | 2394796 A | 5/2004 |
| JP | 01163610 A | 6/1989 |
| JP | 02209121 A | 8/1990 |
| JP | 05046239 A | 2/1993 |
| JP | 07095146 A | 4/1995 |
| JP | 2003001577 A | 1/2003 |
| JP | 2004-151924 | 5/2004 |
| JP | 2004326692 A | 11/2004 |
| KR | 10-2004-0053653 | 6/2004 |
| KR | 10-2004-0063247 | 7/2004 |

* cited by examiner

FIG. 12

SYSTEM AND METHOD FOR RETURNING ROBOT CLEANER TO CHARGER

CROSS-REFERENCE TO RELATED APPLICATIONS

This application claims the benefit of Korean Patent Application No. 2005-80977, filed Aug. 31, 2005, the disclosure of which is incorporated herein by reference in its entirety. This application may also be related to commonly assigned U.S. patent application Ser. No. 11/336,979, filed Jan. 23, 2006, the contents of which are incorporated by reference.

BACKGROUND OF THE INVENTION

1. Field of the Invention

The present invention relates to a robot cleaner capable of autonomous travel and cleaning. In particular, the present invention relates to a system and a method for returning a robot cleaner with a rechargeable battery to a charger.

2. Description of the Related Art

In general, a robot cleaner cleans by suctioning dust, dirt, and other debris (collectively, "dirt") from a surface while traveling. Such a robot cleaner may determine the distance to an obstacle, such as a piece of furniture, an office machine, a wall or the like, that may be in the area. By determining the distance between objects, the robot cleaner may avoid collision with such obstacles. However, it is possible that the robot cleaner may not be able to locate a charger, or that the robot cleaner's battery may die before the robot cleaner reaches the charger.

SUMMARY OF THE INVENTION

Accordingly, the present invention has been made to solve the above-mentioned problems. To this end, a first aspect of the invention provides a system for returning a robot to a charger, the system including: a homing signal transmitter, including at least first, second, and third signal transmitters, each adapted to be provided at a front side of the charger and to respectively transmit signals which are different from each other in at least one of a code and a transmission distance, and a fourth signal transmitter, adapted to be provided on at least one lateral side of the charger and to transmit a signal which is different from the signals of the first, second, and third transmitters in code; a homing signal receiver adapted to be provided at the robot and to receive at least one signal transmitted from the homing signal transmitter; and a controller adapted to identify the at least one signal and to control the robot to return to the charger based at least in part on the at least one signal.

Another aspect of the invention provides a method for returning a robot to a charger, the method including: detecting a return command signal at the robot; receiving at least one infrared signal from the charger; locating the charger based at least in part on the at least one infrared signal; and docking at the charger, thereby enabling the robot to charge.

BRIEF DESCRIPTION OF THE DRAWINGS

The above aspects and features of the present invention will be more apparent from the description of exemplary non-limiting embodiments of the present invention taken with reference to the accompanying drawings, in which.

DETAILED DESCRIPTION OF THE EMBODIMENTS

Hereinbelow, exemplary embodiments of the present invention are described in detail with reference to accompanying drawings. In the following description, like reference numerals refer to like elements throughout.

The robot cleaner may be provided with a power supply, such as a battery (e.g., a rechargeable battery). So that the rechargeable battery may be recharged, the system may further include a charger (e.g., an external charger) to which the robot cleaner may return.

For the robot cleaner to return to the charger when charging is desired, the robot cleaner may determine the location of the charger. Advantageously, the robot cleaner may also locate the charge terminals so that they may be aligned with the robot's connection terminals.

Figure 1A:
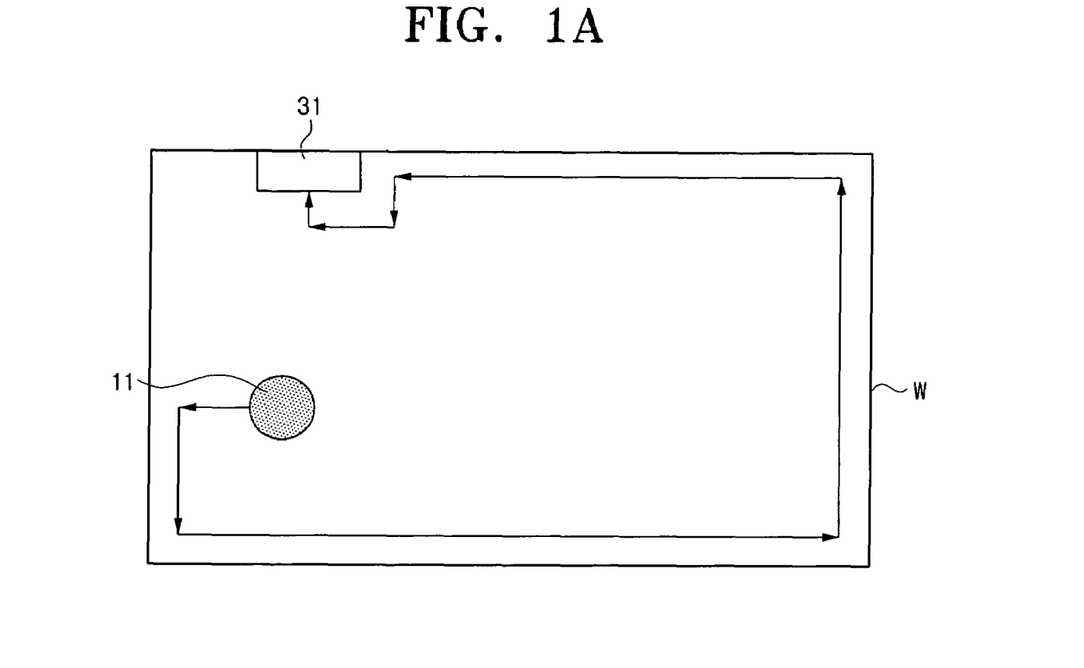
FIGS. 1A to 1D are schematic views showing exemplary methods for returning a robot cleaner to a charger.

FIG. 1A shows a non-limiting method that may be used to return a robot cleaner to the charger. If the robot cleaner detects a charge request signal, the robot cleaner 11 may approach and move along wall W. If a sensor (e.g., a magnetic sensor), which may be provided on the charger 31, is detected while the robot cleaner 11 is moving along the wall W, the robot may identify it as a charger and may attempt to dock with it. While this method requires little programming of the robot, it sometimes requires a long period of travel time for the robot. As a result, the robot cleaner battery may become exhausted before the charger is reached.

Figure 1B:
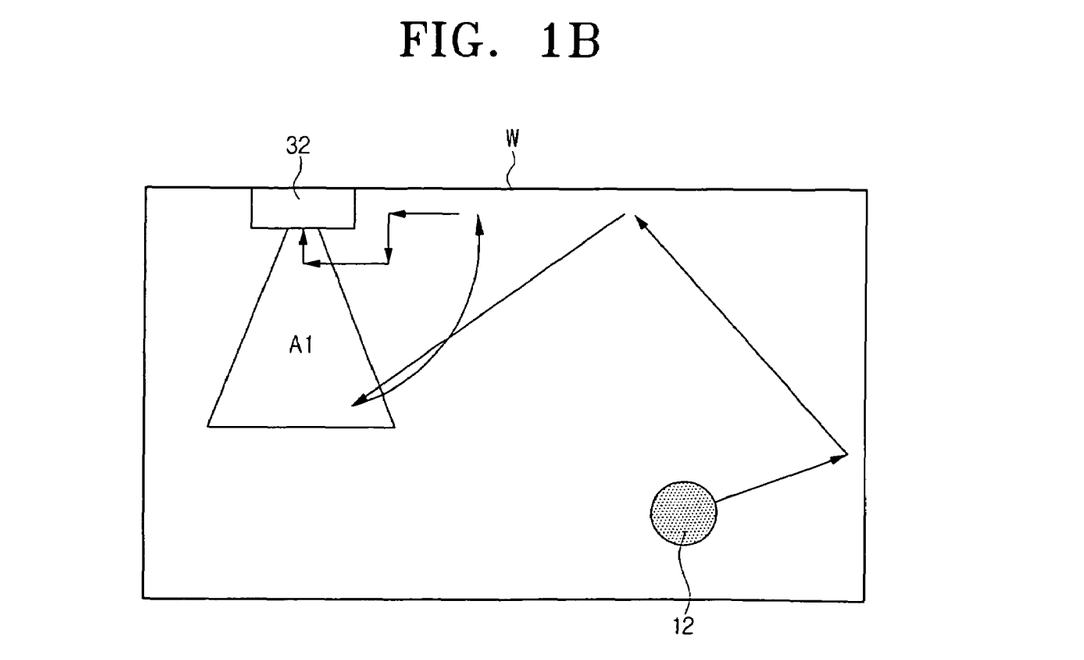

FIG. 1B shows another exemplary method by which a robot cleaner 12 may detect and return to charger 32 using a sensor (e.g., an infrared sensor), and may dock with the charger 32 while the robot cleaner 12 is following wall W. The robot cleaner 12 may randomly travel and detect infrared area A1. Charger 32 may emit infrared light to provide infrared area A1. When the infrared light is detected, the robot cleaner 12 may approach and move along a wall W and may dock with the charger 32. According to this method, the robot cleaner 12 may easily approach the charger 32 if the robot cleaner detects infrared area A1. However, it may take an undesirably long time for the randomly traveling robot cleaner to find the infrared area A1 because the infrared area A1 may be narrowly defined. In addition, docking may sometimes not be properly achieved.

Figure 1C:
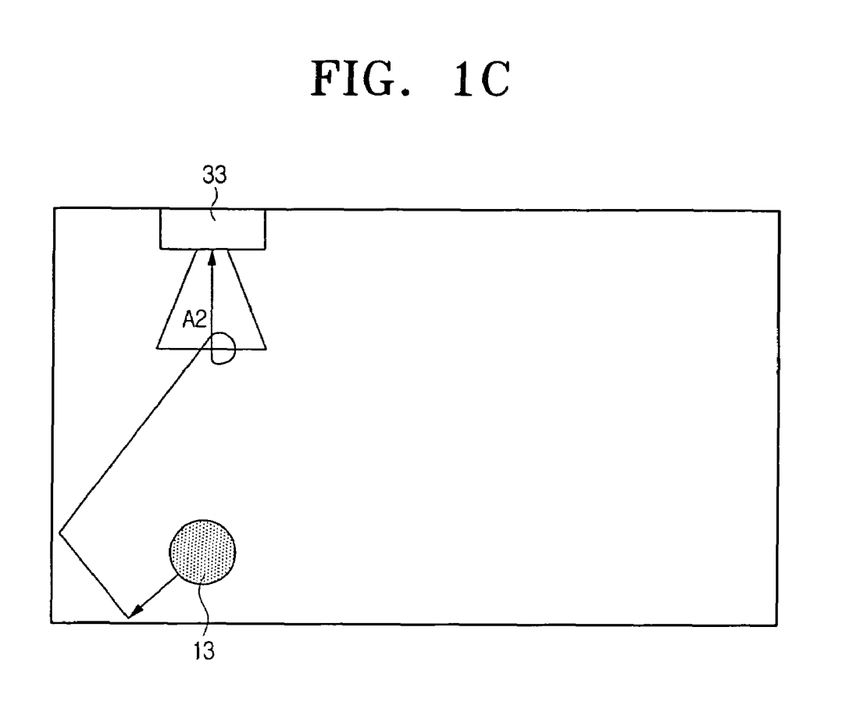

FIG. 1C illustrates yet another exemplary method for guiding a robot cleaner 13 to a charger 33 by providing an infrared sensor on the charger 33. Unlike the method shown in FIG. 1B, the method shown in FIG. 1C enables easy performance of the docking operation because infrared area A2 is defined adjacent the charger 33. However, because the infrared area A2 also may be narrow, it may take a long time for the robot cleaner to find the infrared area A2.

Figure 1D:
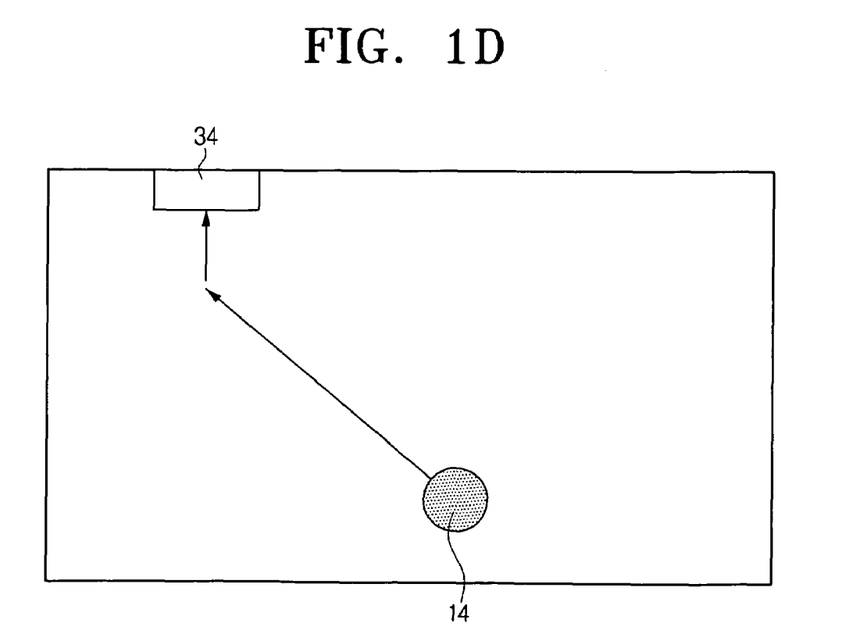

FIG. 1D illustrates still another non-limiting method of locating a charger. According to this method, the area desired to be cleaned and the position of a charger may be stored in memory of the robot cleaner 14 (e.g., as map images). In this case, the robot cleaner 14 can return to the charger 34 as soon as a charge desired signal is detected. However, it may not be economically feasible or desirable to provide memory or processors for processing the image data.

Figure 2:
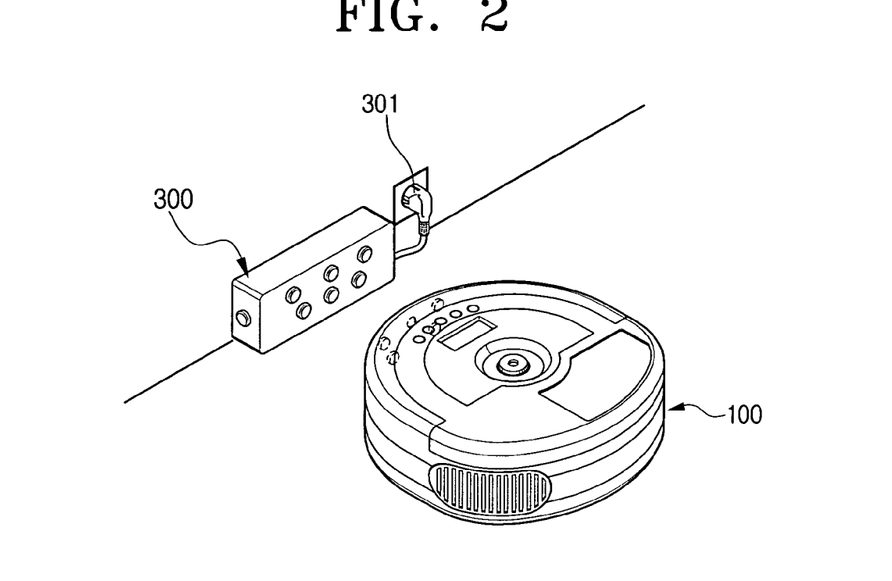
FIG. 2 is a schematic view showing a system for returning a robot cleaner to a charger according to an embodiment of the present invention.
Figure 3:
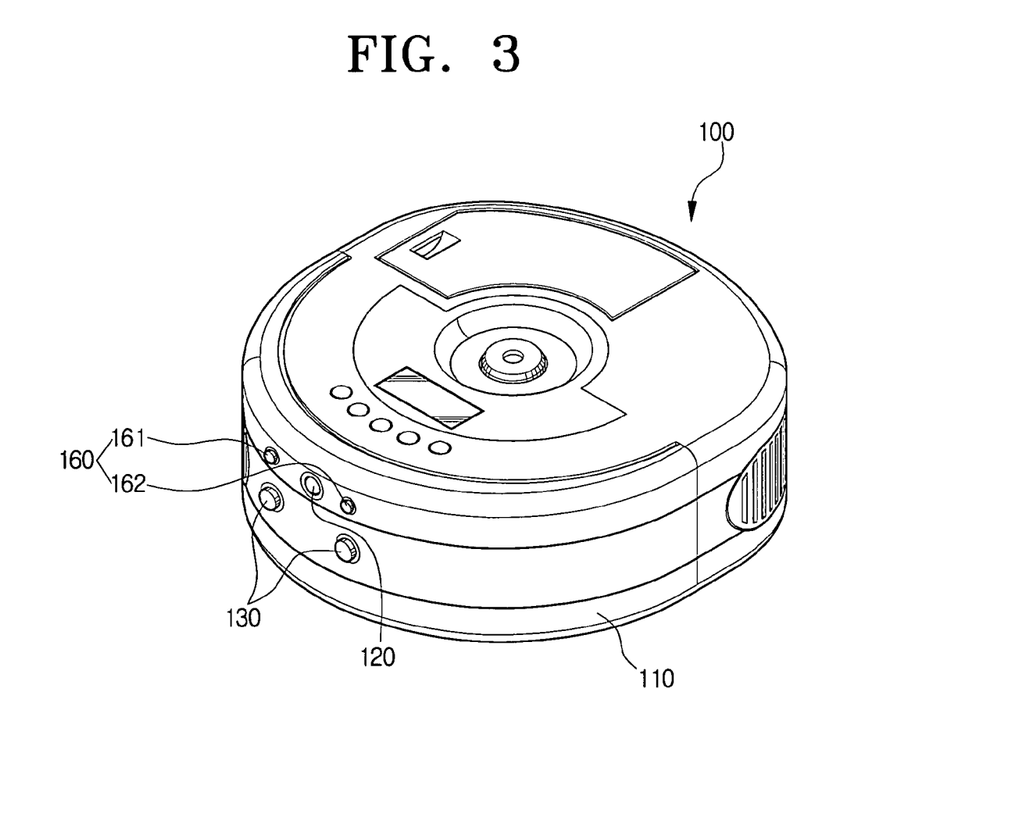
FIG. 3 is a perspective view of the robot cleaner of FIG. 2.
Figure 4:
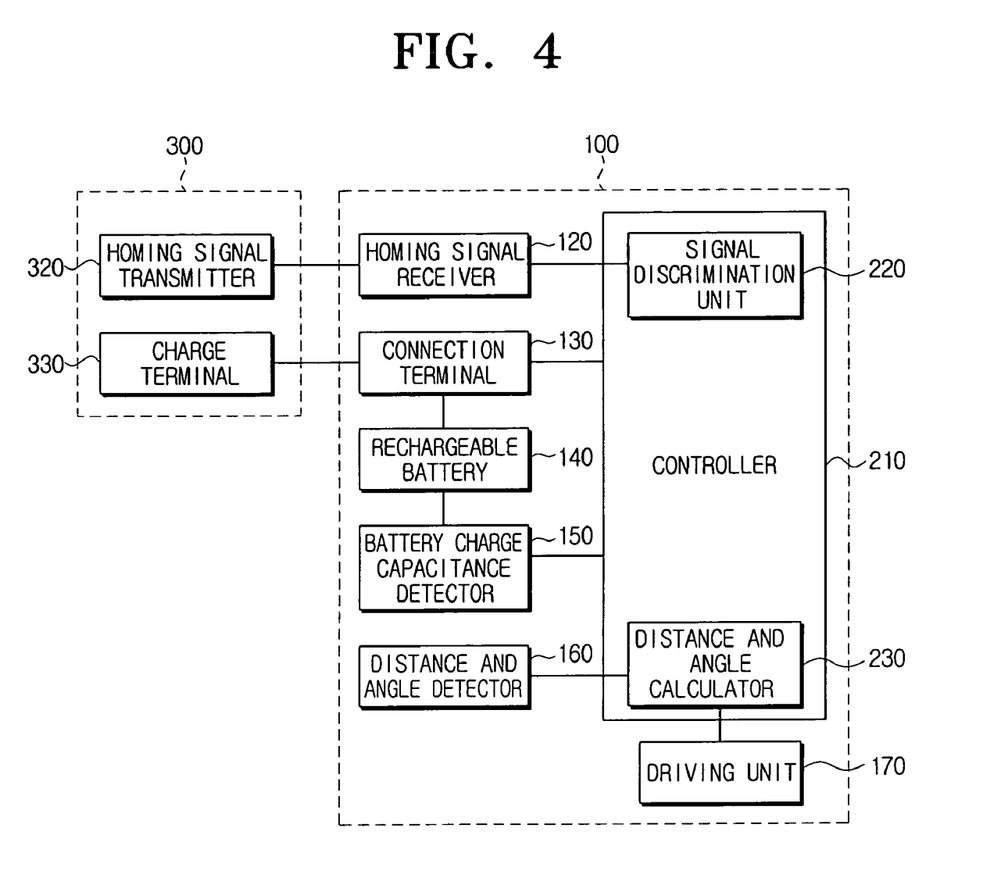
FIG. 4 is a diagram showing a system for returning a robot cleaner to a charger according to another non-limiting embodiment of the present invention.

Referring to FIGS. 2 to 4, a robot cleaner 100 may include body 110, homing signal receiver 120, at least one connection terminal 130, rechargeable battery 140, a battery charge detector 150, a distance and angle detector 160, and a controller 210.

The homing signal receiver 120 may be provided on the front side of the body 110, so that the homing signal receiver 120 may receive at least one signal sent by a homing signal transmitter 320. The homing signal receiver 120 is adapted to exchange signals with the controller 210. Although the installation position of the homing signal receiver 120 is not limited, it may be preferable that the homing signal receiver 120 be installed at a central part of the front side of the body 110, as shown in FIG. 3, so that the homing signal receiver 120 may more effectively receive the signals transmitted from the homing signal transmitter 320.

The connection terminals 130 may be provided on the front surface of the body 110 at a position adapted to effectively engage the charge terminals 330 of charger 300. It may be preferable that the connection terminals 130 be provided in pairs. Additionally, it may be desirable for the connection terminals to be symmetrical to each other relative to the homing signal receiver 120.

The rechargeable battery 140 may be installed at body 110 and may be connected to the connection terminals 130. If connection terminals 130 are plugged into the charge terminals 330 of the charger 300, the rechargeable battery 140 may be charged.

The battery charge detector 150 may detect the remaining charge of the rechargeable battery 140. The battery charge detector 150 may be adapted to exchange signals with controller 210, so that when the detected charge level is less than a desired level, the battery charge detector 150 may send a charge desired signal to the controller 210.

The distance and angle detector 160 may detect at least one of the distance and angle between the robot cleaner 100 and the charger 300 when the robot cleaner 100 approaches the charger 300. The distance and angle detector 160 may transmit signals to the charger 300 and may receive signals from charger 300. The distance and angle detector 160 may be configured to exchange signals with the controller 210, so that when signals from the charger 300 are detected, the distance and angle detector 160 may send a signal to the controller 210.

Although several types of sensors known to those of skill in the art are suitable for use with the distance and angle detector 160, it may be preferable to use infrared sensors. Infrared sensors are relatively inexpensive and easily implemented. As a non-limiting example, the distance and angle detector 160 can be implemented by one or more infrared light emission devices and an infrared receiver. According to a non-limiting aspect of the present invention, it may be preferable that the distance and angle detector 160 includes first and second distance angle detection sensors 161 and 162, which may be positioned at the left and right portions. The first and second distance angle detection sensors 161 and 162 may be symmetrical to each other about the central part of the front side of the body 110. That is, the first and second distance detection sensors 161 and 162 may be symmetrically positioned at the left and right portions about the homing signal receiver 120, as shown in FIG. 3.

If the robot cleaner 100 approaches the charger 300 and attempts to dock, such that at least one connection terminal 130 of the robot cleaner 100 connects to at least one of the charge terminals 330 of the charger 300, at least one of the distance and angle detectors 161, 162 detects the distance to the charger 300. At least one of the distance and angle detectors 161, 162 may be configured to have a desired detection range. This range may be set to be, for example, about 10 cm from the charger 300. Once the robot cleaner 300 enters the desired range, it may be possible for at least one of the distance and angle sensors 161, 162 to send and/or receive infrared signals to/from the charger 300.

The driving unit 170 may include wheels (not shown) installed at one or both sides of the body 110 and a motor (not shown) for rotationally driving the wheels. The motor may drive the wheels according to control signals received from the controller 210 such that the wheels may be independently rotated in the forward or reverse direction and the revolution rates of the wheels may be different from each other. Accordingly, the robot cleaner 100 may turn right and left and travel forward and backward.

Although not shown in the drawings, the robot cleaner 100 may be provided with a suction unit for suctioning dirt from a surface to be cleaned, an obstacle detection sensor for detecting an obstacle existing in the travel direction of the robot cleaner 100, a travel distance detection sensor, as well as other sensors known to those of skill in the art.

The controller 210 may be configured to control components of the robot cleaner 100 so that the robot cleaner 100 cleans. When cleaning is not performed, the controller 210 may control the robot cleaner 100 to standby at the charger 300 so that the rechargeable battery 140 remains charged.

As shown in FIG. 4, the controller 210 may include a signal discrimination unit 220 and distance and angle calculator 230. The signal discrimination unit 220 may discriminate infrared signals received by the homing signal receiver 120, and may output control codes or digital signals corresponding to the discriminated signals. The control codes or digital signals may be previously set in the signal discrimination unit 220. The controller 210 may control the driving unit 170 using the outputted signals.

The distance and angle calculator 230 may calculate the distance and angle between the robot cleaner 100 and the charger 300 using signals transmitted from the distance and angle detector 160. According to the present non-limiting embodiment, the distance from at least one of the first and second distance detection sensors 161 and 162 to the charger 300 can be determined using the signals which are respectively transmitted from the first and second distance detection sensors 161 and 162. That is, because the velocity of the infrared signals is fixed, it is possible to calculate the respective distances from the first and second distance detection sensors 161 and 162 to the charger 300 by calculating the amount of time elapsed between when at least one of the first and second distance detection sensors 161 and 162 transmits a signal and when a corresponding signal is received by at least one of the first and second distance detection sensors 161 and 162. In addition, the distance and angle calculator 230 can determine the relative positioning of the robot cleaner 100 and the charger 300 and may calculate the angle between the robot cleaner 100 and the charger 300 using the difference between the distance L1 from the first distance detection sensor 161 to the charger 300 and the distance L2 from the second distance detection sensor 162 to the charger 300 (see FIG. 10).

Using the signals discriminated by the signal discrimination unit 220, the controller 210 may drive the driving unit 210 so that the robot cleaner 100 can return to a position adjacent the charger 300. Meanwhile, using the distance and angle calculated by the distance and angle calculator 230, the controller 210 may control the driving unit so that the connection terminals 130 of the robot cleaner 100 can be rapidly and precisely connected to the charge terminals 300 of the charger 300 when docking.

Figure 5A:
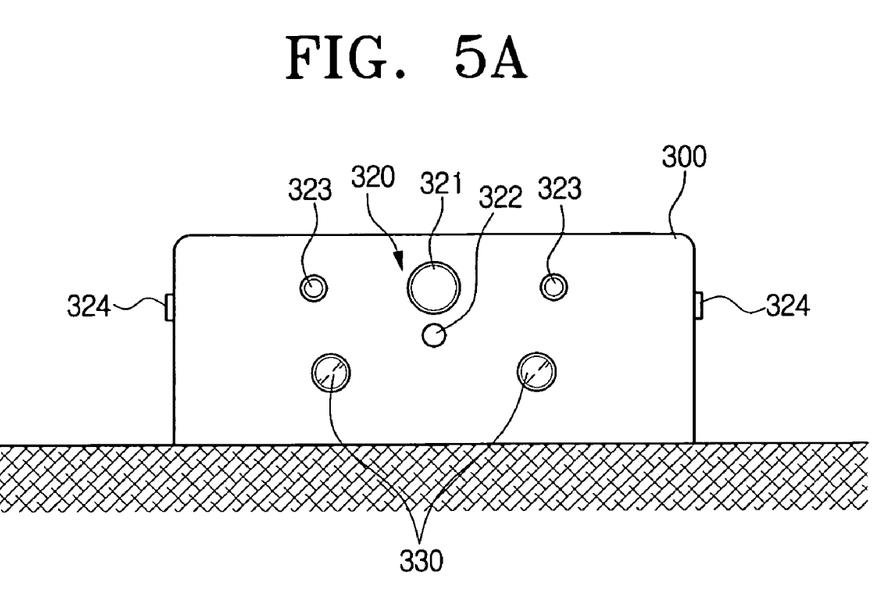
FIGS. 5A and 5B are front elevational and top plan views of the charger of FIG. 2.
Figure 5B:
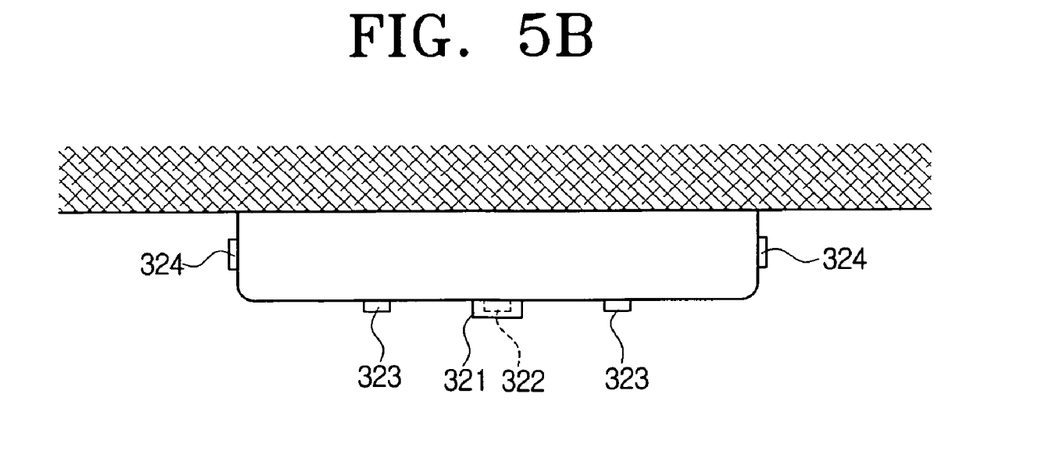

Referring to FIGS. 5A and 5B, the charger 300 may be provided with a homing signal transmitter 320 as well as charge terminals 330. The charge terminals 330 may be connected to a power cord 301 (see FIG. 2) through an internal transformer, a converter and a power cable. The charge terminals 330 may be connected to (e.g., plugged into) the connection terminals 130 of the robot cleaner 100 (see FIG. 3) to supply power to the rechargeable battery 140. The charge terminals 330 may be installed in the charger 300 at approximately the same height as the connection terminals 130. However, other configurations known to those of skill in the art are also within the scope of the present invention.

The homing signal transmitter 320 may include first, second, third, and fourth signal transmitters 321, 322, 323 and 324. Because the first to fourth signal transmitters 321 to 324 transmit signals that may be different from each other in code, the signal discrimination unit may be configured to discriminate the respective signals transmitted by the first to fourth signal transmitters 321 to 324. The first to third signal transmitters 321 to 323 may be provided on the front side of the charger 300 and the fourth signal transmitter 324 may be provided at a side of the charger 300. According to the present non-limiting embodiment, the first to fourth signal transmitters 321 to 324 include infrared light emission devices such as infrared LEDs. In this case, an infrared receiver may be employed in the homing signal receiver 120. By employing infrared light emission devices and an infrared receiver, the system for returning a robot cleaner to a charger can be relatively inexpensively implemented.

Although it is possible to provide plural homing signal receivers 120, which correspond with the first and second signal transmitters 321 and 322, respectively, it may be preferable to provide a single homing signal receiver 120 so that it can receive all the signals transmitted from the first to fourth signal transmitters 321 to 324. A single homing signal receiver 120 may reduce costs and the space required for installing the homing signal receiver 120. Therefore, it may be preferable for the first to fourth signal transmitters 321 to 324 to transmit infrared signals having the same or approximately the same frequency.

Figure 6:
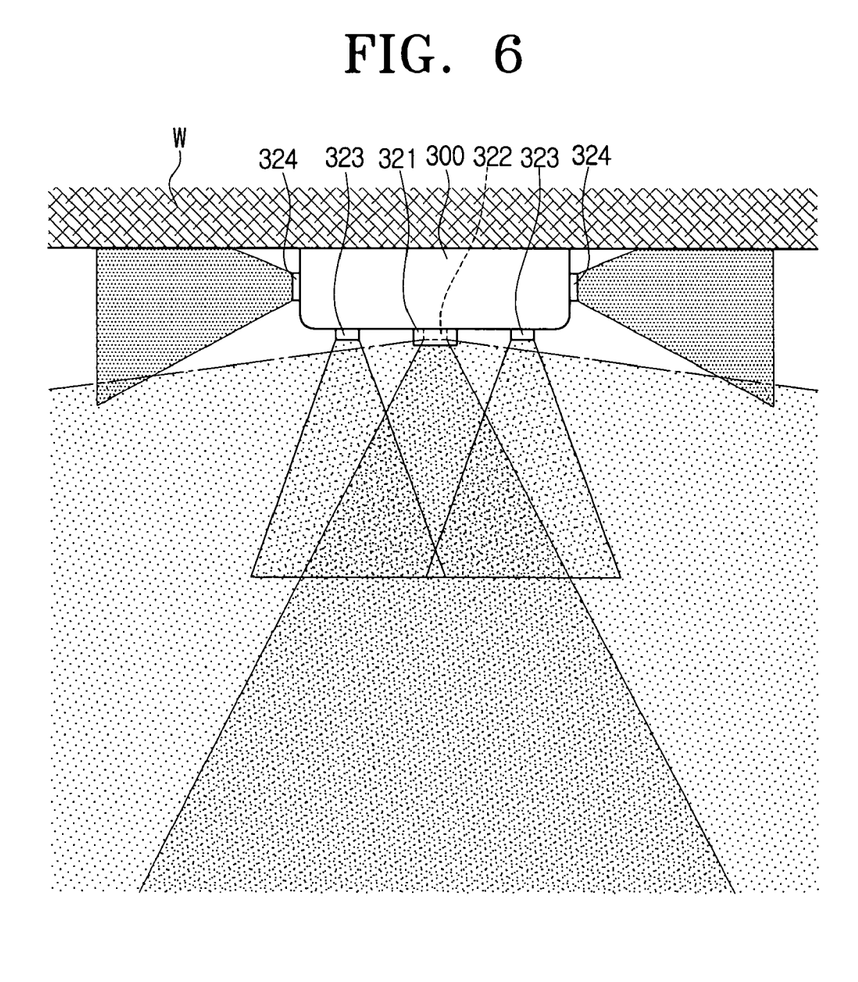
FIG. 6 is a view schematically showing signal transmission distances and angles of a homing signal transmitter according to a non-limiting embodiment of the present invention.

Referring to FIG. 6, the infrared signals, which may be transmitted from each of the first, second, and third signal transmitters 321, 322, and 323, may be different from each other in signal transmission angle and distance. An object of the present invention is to enable the robot cleaner 100 to receive infrared signals, and to rapidly approach the charger 300 using the signals.

In more detail, the infrared signals may vary with respect to the pattern of high and low voltages alternating in the signal per second. For example, the first transmitter may send a signal including three high voltages alternated with three low voltages, while the second transmitter may send a signal including four high voltages alternated with four low voltages. Of course, these examples are non-limiting, and other signals are within the scope of this invention. For ease of reference, these signals are referred to herein as "different in code." Additionally, it may be desirable that the infrared signals transmitted by the first to fourth signal transmitters 321 to 324 be distributed over the front and lateral sides of the charger 300, so that the robot cleaner 100 can receive infrared signals in any area adjacent the charger 300.

The signal transmission distances and angles may be gradually reduced in the order of the first signal transmitter 321, the second signal transmitter 322, and the third signal transmitter 323. According to a non-limiting aspect of the present invention, it may be preferable to set the signal transmission angles and distances such that the first signal transmitter 321 has a signal transmission angle in the range of about 120° to 170° and a signal transmission distance in the range of about 14 to about 20 m, the second signal transmitter 322 has a signal transmission angle in the range of about 30° to 60° and a signal transmission distance in the range of about 10 to about 13 m, and the third signal transmitter 323 has a signal transmission angle in the range of about 10° to 20° and a signal transmission distance in the range of about 1 to about 2 m. These signal transmission distances and angles (or other desired signal transmission distance and angles) may be set as default values during manufacturing. In addition, by providing adjustment grips on at least one side of the first to third signal transmitters 321 to 323, it may be possible to precisely adjust the signal transmission angles.

For the homing signal receiver 120 to efficiently receive signals, it may be preferable that the first and second signal transmitters 321 and 322 be vertically arranged at or near the central part of the charger 300. In addition, because the signal transmission angle and distance of the third signal transmitter 323 may be small, it may be desirable to provide two signal transmitters for the third signal transmitter 323. These transmitters may be arranged at opposite lateral sides of the charger 300 to be symmetrical to each other about the first and second signal transmitters 321 and 322.

A possible configuration of the system of the present invention may include the charger installed at a wall. In that case, the robot cleaner 100 may not detect an infrared signal transmitted from the first to third signal transmitters 321 to 323 when the robot cleaner 100 travels along the wall on which the charger 300 is installed. Therefore, it may be desirable to provide two signal transmitters for the fourth signal transmitter 324 at opposite lateral sides of the charger 300. The fourth signal transmitter 324 may also transmit a signal having a code which is different from those of the infrared signals sent by the first to third signal transmitters 321 to 323. However, it is not necessary for the signal transmission angle and distance of the fourth signal transmitter 324 to be different from those of the first to third signal transmitters 321 to 323. According to the present embodiment, it may be preferable to set the fourth signal transmitter 324 in such a way that it has a signal transmission angle of about 60° and a signal transmission distance of about 1 m.

According to another non-limiting embodiment, the robot cleaner 100 may standby in a state in which the connection terminals 130 of the robot cleaner 100 are connected to the charge terminals 330 of the charger 300. When a command signal for cleaning is received, the robot cleaner 100 separates from the charger 300 and cleans an area determined by at least one of a user's command or a previously programmed command.

If the cleaning is completed or a charge desired signal is received by the battery charge detector 150 during cleaning, the controller 210 may change the mode of the robot cleaner 100 into a return mode, so that the robot cleaner returns to the charger 300. That is, the controller 210 may control the robot cleaner 100 so that the robot cleaner 100 travels from its position to receive signals sent by the homing signal transmitter 320 of the charger 300. For example, the robot cleaner 100 may travel in a zigzag pattern, randomly, or following the wall W (on which the charger 300 is provided) until infrared signals sent by the homing signal transmitter 320 are received by the homing signal receiver 120.

The exemplary method for returning and docking the robot cleaner 100 with the charger 300 can be divided into two steps: a homing step (in which the robot cleaner 100 is guided to approach the charger 300) and a docking step (in which the connection terminals 130 of the robot cleaner 100 is connected to the charge terminals 330 of the charger 300).

Figure 7:
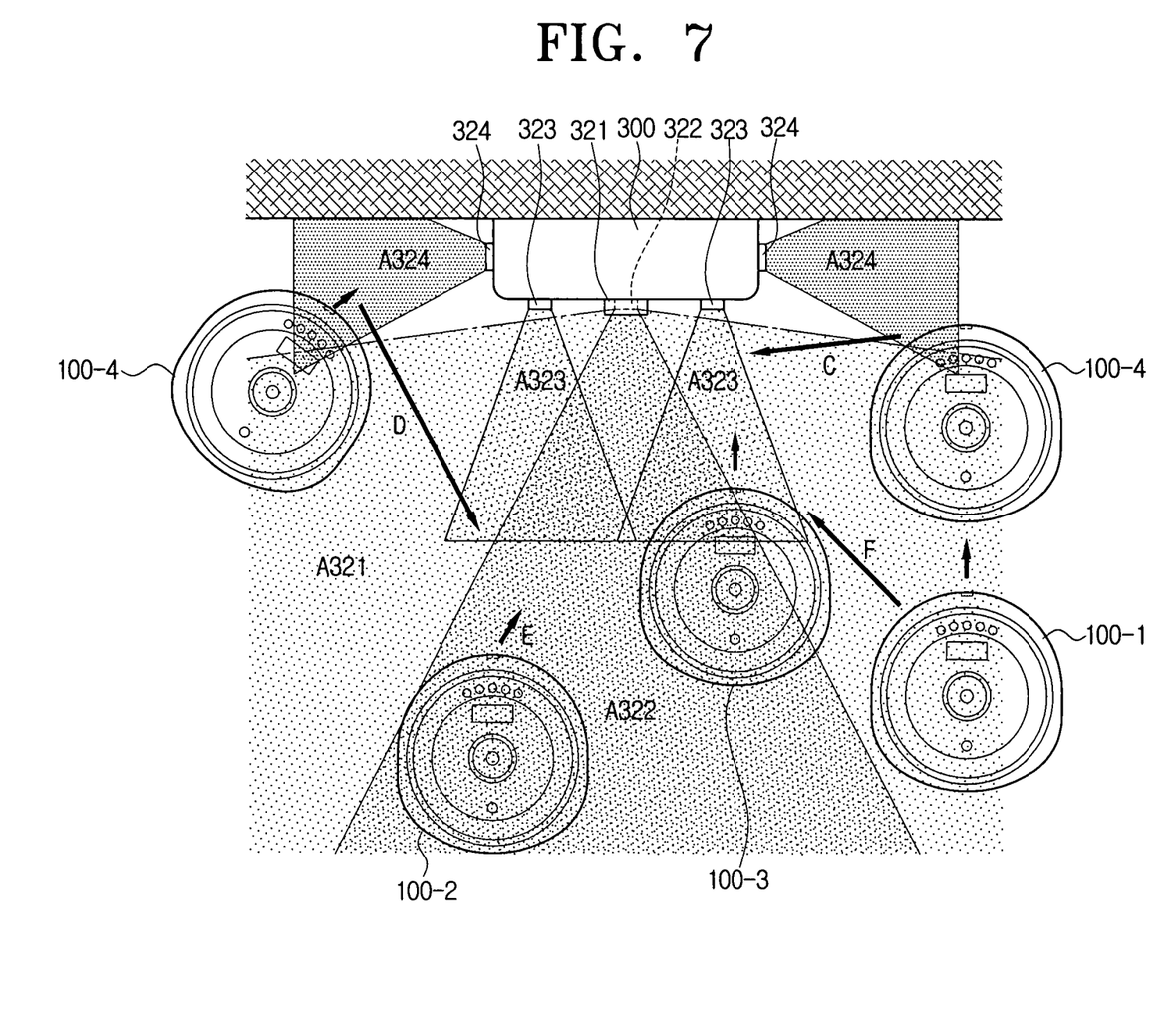
FIG. 7 illustrates a method for returning a robot to a charger according to a non-limiting embodiment of the present invention.
Figure 8:
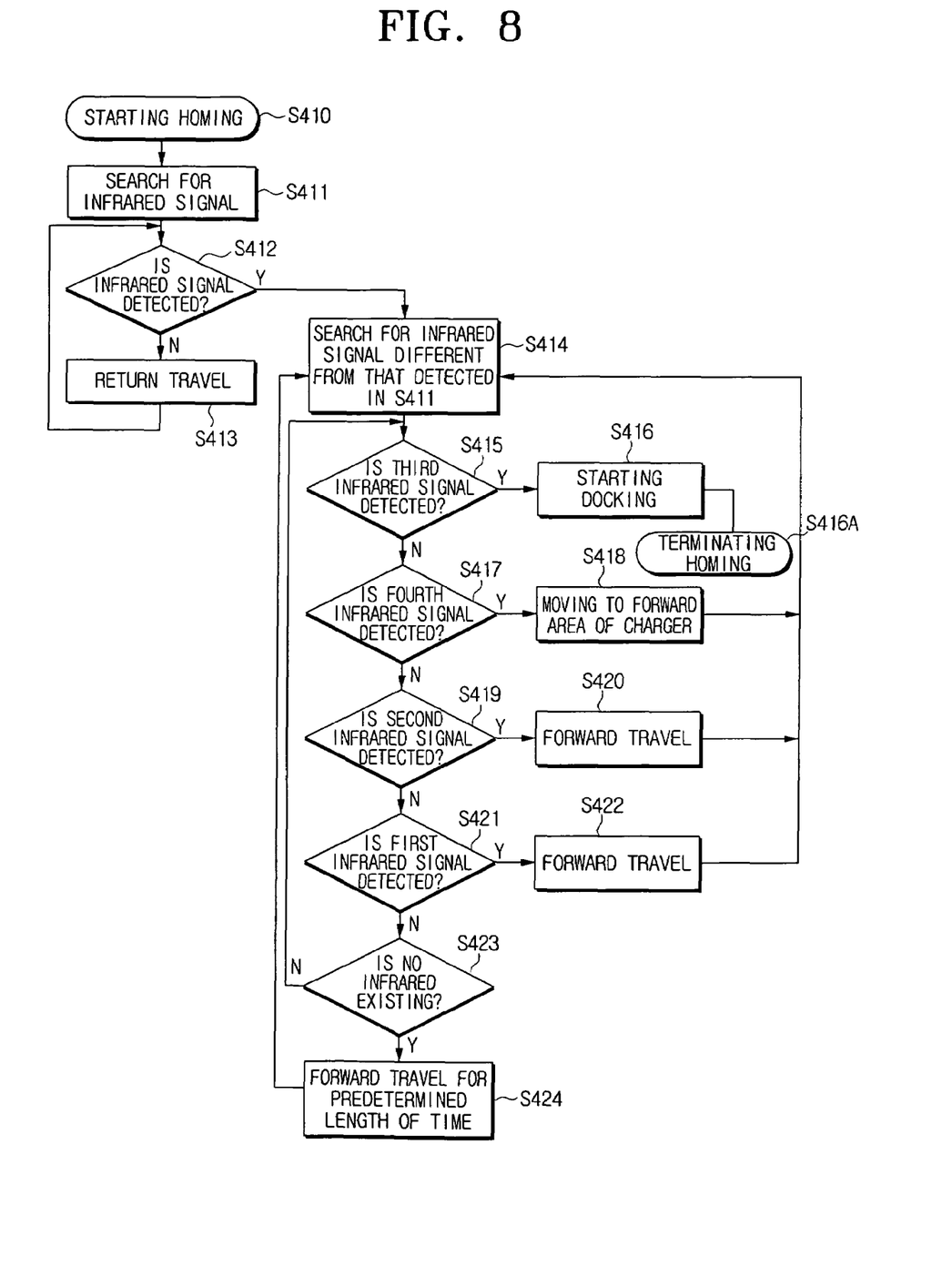
FIG. 8 is a flowchart of the homing step of FIG. 7.

The homing step is described with reference to FIGS. 7 and 8. The robot cleaner 100 starts homing (S410) and searches for an infrared signal while traveling (S411). The robot cleaner 100 may continuously travel until homing signal receiver 120 (see FIG. 3) detects infrared signals (S413). Here, the infrared signals, which may be transmitted from the first to fourth signal transmitters 321 to 324, are referred to as first, second, third, and fourth signals A321, A322, A323, and A324, respectively.

If an infrared signal is detected (S412), the robot cleaner 100 may turn without making progress, so that the homing signal receiver 120 may locate another infrared signal, the code of which may be different from the previously detected infrared signal (S414). Because the signal transmission angle and distance of the first infrared signal A321 are the largest among the first to fourth infrared signals, the homing signal receiver 120 generally initially detects the first infrared signal A321. Therefore, if the first infrared signal A321 is detected, the robot cleaner 100 searches to find the second to fourth infrared signals A322 to A324. Meanwhile, because it is an object of the present invention to enable the robot cleaner 100 to rapidly and precisely approach the charger 300, the robot cleaner 100 may continuously search until the third infrared signal A323 is detected.

If the robot cleaner 100-3 approaches the charger 300 and detects the third infrared signal A323 (S415), the robot cleaner 100-3 may enter the docking step S416, and may terminate the homing step (S416A).

If the fourth infrared signal A324 is detected while the third infrared signal A323 is not detected (S417), the robot cleaner 100-4 may move toward the forward area of the charger 300. To do this, the robot cleaner 100-4 may turn left or right by 90° as indicated by arrows C and D before moving forward. The fourth infrared signal A324 may be transmitted from the lateral sides of the charger 300. As described above, the transmission distance of the fourth infrared signal A324 may be relatively short (about 1 m), and the transmission angle may be relatively wide. Therefore, an effective path for detecting the third infrared signal A323 may be obtained if the robot cleaner turns left or right by 90° and travels straight, as shown in FIG. 7. Meanwhile, if the robot cleaner 1004 receives the first infrared signal A321 without receiving the third infrared signal 323 while it is traveling straight after turning, the robot cleaner 1004 may travel toward the front area of the charger 300, which emits the third infrared signal A323. Therefore, the robot cleaner could rapidly detect the third infrared signal A323.

Upon detecting the second infrared signal A322 without detecting the third and fourth infrared signals A323 and A324 when searching for the infrared signal, the robot cleaner 100-2 may be caused to move toward the front area of the charger 300 (which emits the signals) as indicated by arrow E (S420).

If the robot cleaner detects the first infrared signal A321 without detecting the second to fourth infrared signals A322 to A324 (S421), the robot cleaner 100-1 is caused to move toward the front area of the charger 300 as indicated by arrow F (S422).

Although the infrared signals transmitted from the respective signal transmitters may each have a fan-shape transmission area as shown in the drawing, the reception sensitivity of infrared signals may be highest for an infrared signal transmitted from the original signal source. Because the first and second signal transmitters 321 and 322 may be provided at the central part of the front side of the charger 300 and the homing signal reception part 120 may be positioned at the center of the front side of the robot cleaner 100, thereby receiving the first and second infrared signals A321 and A322, the robot cleaner may most effectively approach the central part of the front of the charger 300.

If the robot cleaner was unable to detect any infrared signal during travel, it may travel toward the charger 300 for a desired length of time (S424) and may continuously search until the third infrared signal A323 is detected. The desired length of time may be predetermined based on a variety of factors, including anticipated battery life.

As described above, the homing signal receiver 120 of the robot cleaner 100 may receive a plurality of infrared signals, which may be different from each other in code, signal transmission angle, and signal transmission distance. The controller 210 (see FIG. 4) may prioritize the respective received infrared signals. That is, the controller 210 may prioritize the received infrared signals in the order of the third infrared signal A323, the fourth infrared signal A324, the second infrared signal A322, and the first infrared signal A321. If two or more different infrared signals are received, the controller 210 may control the robot cleaner 100 to travel based on the highest priority level of the received signals.

Therefore, according to the embodiment described above, at least one infrared signal transmitter, which may be different in signal transmission angle and distance from another infrared signal transmitter, may be provided at the charger 300, the controller 210 may calculate an effective (even optimal) path depending on the distance between the robot cleaner 100 and the charger 300. As a result, it is possible to make the robot cleaner 100 rapidly and precisely return to the charger 300. In addition, because the process and algorithm for returning the robot cleaner 100 to the charger 300 are simple, manufacturing costs may be reduced.

Figure 9:
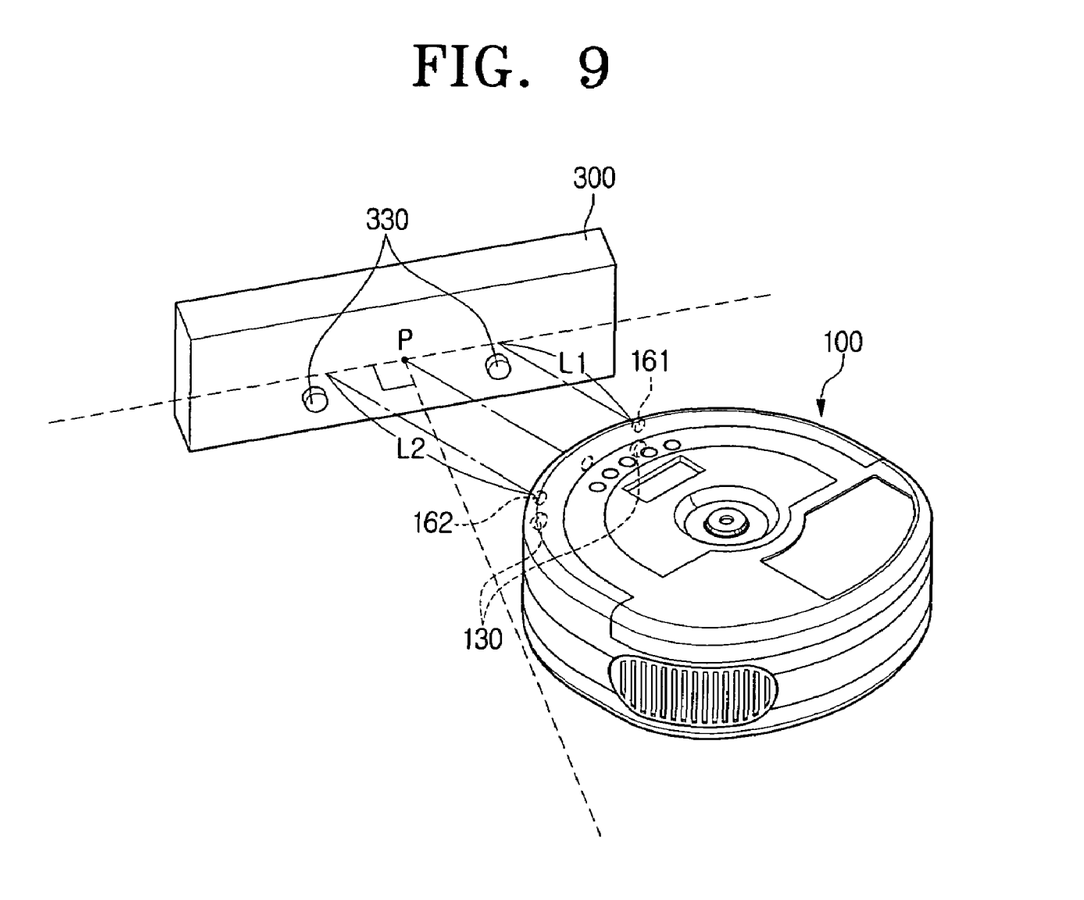
FIGS. 9 to 11 illustrate a docking step in a method for returning a robot to a charger according to a non-limiting embodiment of the present invention.

Now, the docking step will be described with reference to FIGS. 9 to 11. For the convenience of description, the respective signal transmitters 321 to 324 (see FIG. 5A) provided in the charger 300 are omitted in FIGS. 9 to 11.

If the homing signal receiver 120 detects the third infrared signal 323 (see FIG. 7), and the docking step is started, the robot cleaner 100 may move to a position spaced from the charger 300 by a predetermined distance (e.g., about 10 cm) (S431). The predetermined distance can be calculated by the first and second distance detection sensors 161 and 162 which may be provided in the robot cleaner 100. The first and second distance detection sensors 161 and 162 may each transmit infrared signals to the charger 300 and may receive the infrared signals reflected from the charger 300. Here, because the velocity of the infrared signals is fixed, it is possible to calculate the respective distances L1 and L2 from the first and second distance detection sensors 161 and 162 to the charger using the time elapsed between the transmitted infrared signals and the received infrared signals. It is possible to use the larger or smaller of the distances L1 and L2 or the mean of L1 and L2.

If the robot cleaner 100 reaches a distance of about 10 cm from the charger 300, the controller 210 (see FIG. 4) may determine if the robot cleaner 100 and the charger 300 are substantially parallel to each other (S432). Such a determination may be made by comparing the values of L1 and L2. For example, if the calculated distances L1 and L2 are identical to each other, the robot cleaner 100 and the charger 300 may be parallel to each other. If not, the robot cleaner 100 and the charger 300 may not be parallel to each other. However, because it is unlikely that L1 and L2 would be completely identical, it may be desirable to define a range of tolerance for each of the values L1 and L2. If the calculated values of L1 and L2 are substantially identical within the ranges of tolerance, it is effective to determine that the robot cleaner 100 and the charger 300 are substantially parallel to each other.

If the robot cleaner 100 and the charger 300 are not substantially parallel to each other, the distance and angle calculator 230 (see FIG. 4) may calculate the angle between the robot cleaner 100 and the charger 300 (S433). The angle can be calculated using the distance L1 from the first distance detection sensor 161 to the charger 300 and the distance L2 from the second detection sensor 162 to the charger 300 as follows.

Figure 10:
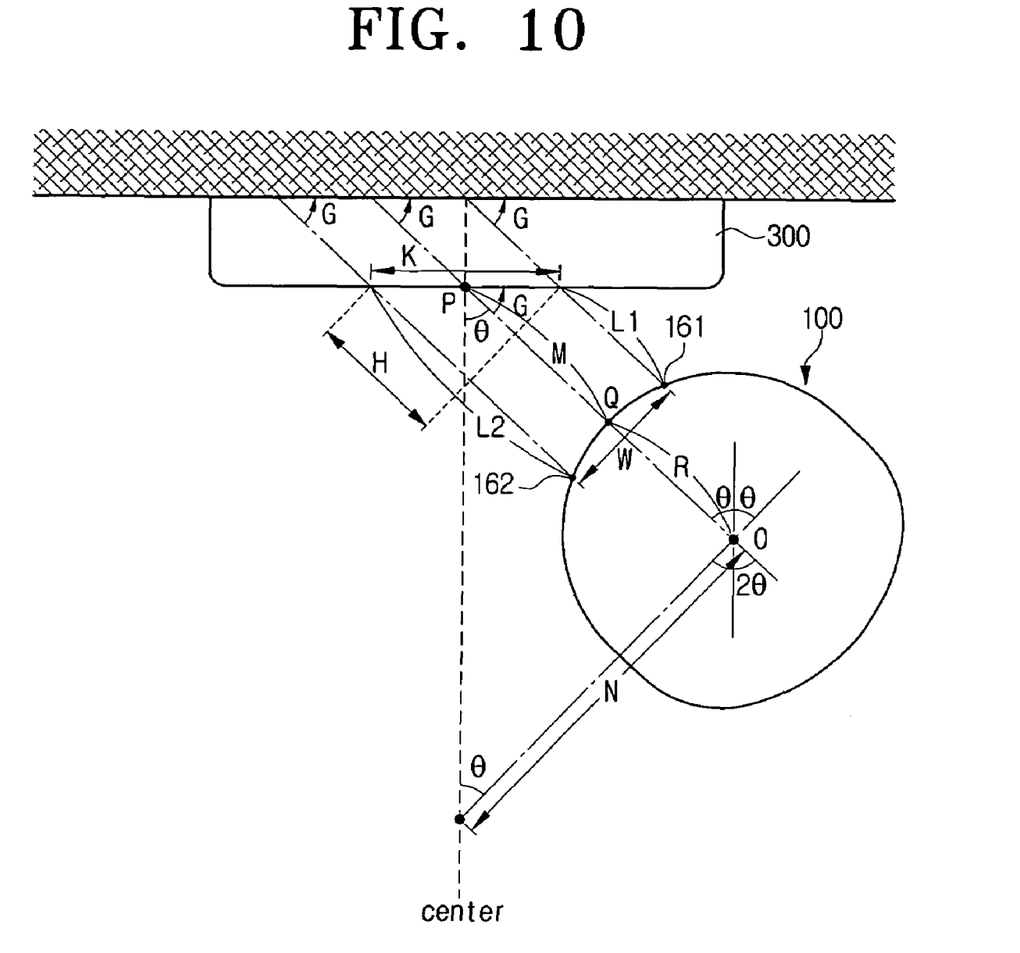

Referring to FIG. 10, assuming that the difference between L2 and L1 is H, the distance between the first distance detection sensor 161 and the second distance detection sensor 162 is W, K can be calculated as follows:

$$K = \text{sqrt}(H^2 + W^2) \quad (1)$$

Therefore, the angle θ equals to arccos (H/K), and consequently the deviated angle θ between the robot cleaner 100 and the charger 300 can be calculated as follows:

$$\theta = 90° - G \quad (2)$$

Figure 11:
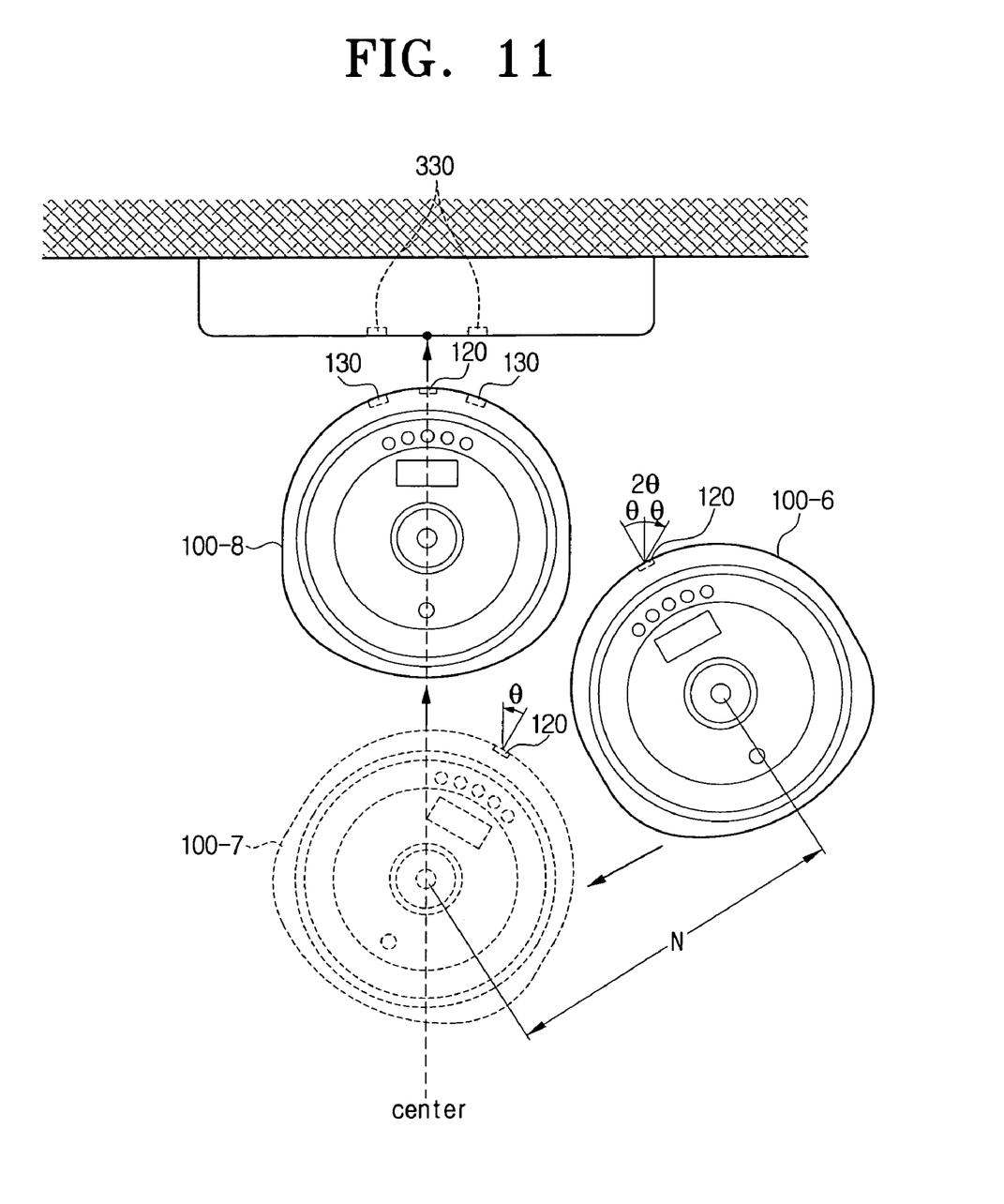

After calculating the angle θ between the robot cleaner 100 and the charger 300, the robot cleaner 100-6 may turn in the direction in which the homing signal receiver 120 rotates away from the center line of the charger 300 (i.e., in a clockwise direction in FIG. 11) by an angle equal to about twice the calculated angle θ as indicated in FIG. 11 (S434). Then, the robot cleaner 100-6 may travel straight back by distance N so that the center point of the robot cleaner 100-6 and the central line of the charger 300 are in line with each other (S435).

The distance N may be calculated as follows. Referring to FIG. 10 again, it can be determined that the distance N for the robot cleaner to travel back is equal to the distance from the center point O of the robot cleaner 100 to the center point P of the charger 300. That is, if an extension line were drawn from the center point O of the robot cleaner 100 to the central line of the charger 300 after the robot cleaner 100 has turned by 2θ about the central point thereof, the angle between the extension line and the central line becomes θ. Accordingly, the distance N for the robot cleaner to travel back and the distance from the center point O of the robot cleaner 100 to the center point P of the charger 300 become equal to each other because they form two equal sides of an isosceles triangle. Assuming the distance from the front center Q of the robot cleaner 100 to the center point of the charger 300 is M, M can be determined as follows:

$$M = (L1 + L2)/2 \quad (3)$$

Here, it can be appreciated that the value of M is an approximate value. The connection terminals of the robot cleaner 100 and the charge terminals 330 of the charger 300 may be configured such that they can be joined with each other even if they are correctly aligned with each other. In addition, it shall be taken into consideration that the connection terminals 130 of the robot cleaner 100 may protrude from the front surface of the robot cleaner 100. As a result, the approximate value may be different from the real value. However, the difference is generally not large and the connection terminals 130 and the charge terminals 330 can generally still be joined with each other. By way of example, it was described above that the extension line from the center point O of the robot cleaner 100 and the center point P of the charger 300 may be in line with each other when the robot cleaner 100 and the charger 300 are not parallel to each other as shown in FIG. 10. However, depending on the deviated angle of the robot 100, the extension line and the center point P may not be in line with each other. Even if such an error is produced, it can be neglected and the connection terminals 130 and the charge terminals 330 can be joined with each other. If the error is large, the determination as to if the robot cleaner 100 and the charger 300 are parallel to each other may be performed again as described below.

Assuming that the radius of the robot cleaner 100 is R, the distance N for the robot cleaner 100 to travel to make the center point O of the robot cleaner 100 and the central line extending from the center point P of the charger 300 aligned with each other can be calculated as follows:

$$N = M + R. \quad (4)$$

Referring to FIG. 11 again, after traveling so that the center point of the robot cleaner 100-7 and the central line of the charger 300 are aligned, the robot cleaner 100-7 may turn in a direction in which the homing signal receiver 120 rotates toward the central line of the charger 300 (i.e., in a counterclockwise direction in FIG. 11) by θ (S436). Then, the robot cleaner 100-7 and the charger 300 may become parallel to each other. Then, the robot cleaner 100-8 may travel straight so that it approaches the charger 300 to a distance of about 10 cm from the charger 300, thereby performing the step S431 again.

Figure 12:
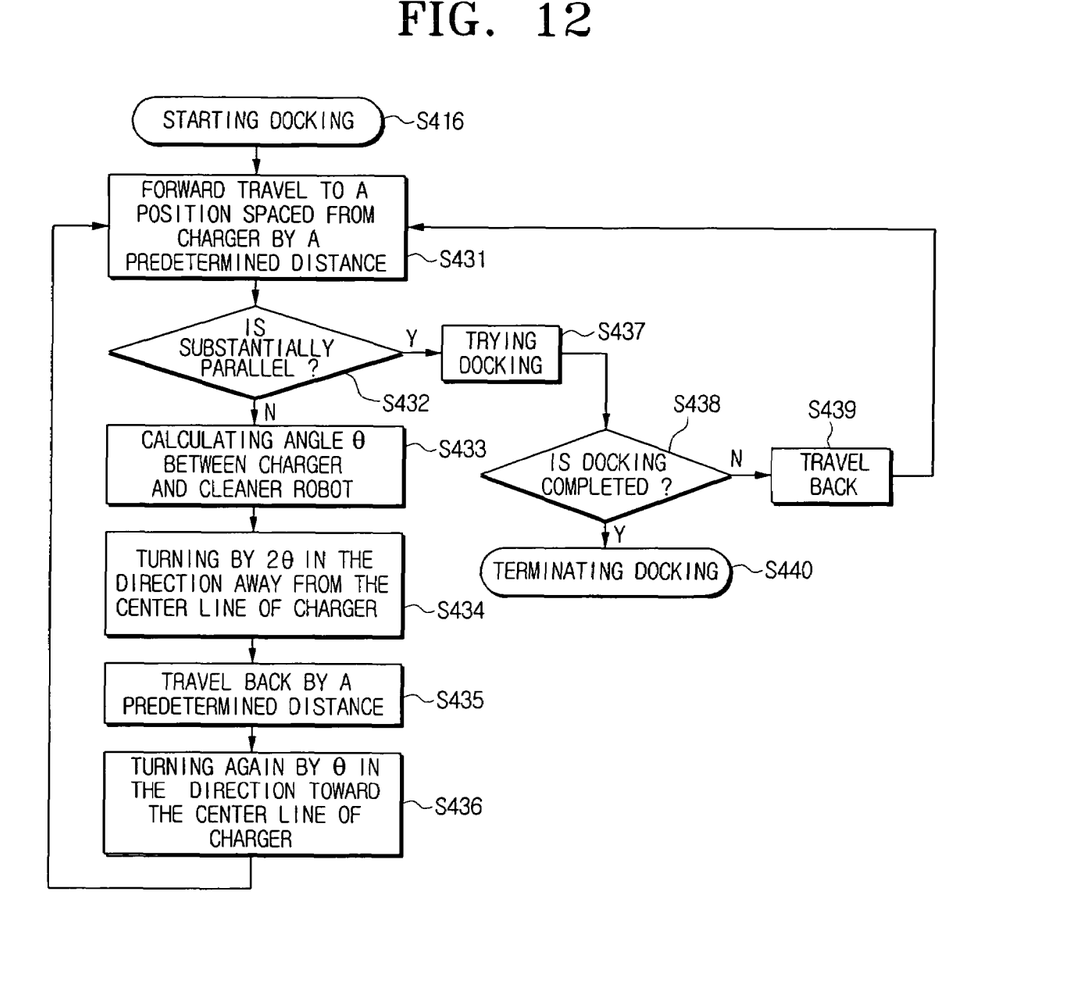
FIG. 12 is a flowchart showing the exemplary docking step of FIGS. 9 to 11.

Meanwhile, if the robot cleaner 100-8 and the charger 300 are parallel to each other, the robot cleaner 100 may attempt to dock so that the connection terminals 130 can be connected with the charge terminals (S437). Then, it may be determined if the docking has been completed (S438). If the docking is completed (i.e., if the connection terminals 130 and the charge terminals 330 are joined with each other), the docking operation may be terminated (S440). However, if the docking is not completed (i.e., if the connection terminals 130 and the charge terminals 330 are correctly joined with each other), the robot cleaner may travel back about 15 cm (S439) and may repeatedly perform step S431.

Although representative embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A system for returning a robot to a charger, the system comprising:
    a homing signal transmitter, including at least first, second, and third signal transmitters, each adapted to be provided at a front side of the charger and to respectively transmit signals which are different from each other in at least one of a code and a transmission distance, and at least two fourth signal transmitters adapted to be provided on opposite lateral sides of the charger and to transmit a signal which is different from the signals of the first, second, and third transmitters in code;

a homing signal receiver adapted to be provided at the robot and to receive at least one signal transmitted from the homing signal transmitter; and a controller adapted to identify the at least one signal and to control the robot to return to the charger based at least in part on the at least one signal.

2. A system as claimed in claim 1, wherein the first signal transmitter has a first transmission distance that is greater than a second transmission distance of the second signal transmitter.

3. A system as claimed in claim 2, wherein the second transmission distance is greater than a third transmission distance of the third signal transmitter.

4. A system as claimed in claim 1, wherein the signal transmission distances of the first, second, and third signal transmitters are in a range of about 14 to about 20 m, about 10 to about 13 m, and about 1 to about 2 m, respectively.

5. A system as claimed in claim 1, wherein the first, second, and third signal transmitters each have different signal transmission angles.

6. A system as claimed in claim 5, wherein the first signal transmitter has a first transmission angle that is greater than a second transmission angle of the second signal transmitter.

7. A system as claimed in claim 6, wherein the second transmission angle is greater than a third transmission angle of the third signal transmitter.

8. A system as claimed in claim 5, wherein the signal transmission angles of the first, second, and third signal transmitters are in a range of about 120° to about 170°, about 30° to about 60°, and about 10° to about 20°, respectively.

9. A system as claimed in claim 1, wherein the first and second signal transmitters are vertically arranged at the charger.

10. A system as claimed in claim 9, wherein the third signal transmitter includes at least two transmitters adapted to be symmetrically positioned at either side of the first and the second signal transmitters on the front side of the charger.

11. A system as claimed in claim 1, wherein the third signal transmitter includes at least two transmitters adapted to be symmetrically positioned at either side of the first and the second signal transmitters on the front side of the charger.

12. A system as claimed in claim 1, wherein at least one of the first, second, and third signal transmitters includes an infrared light emission device.

13. A system as claimed in claim 1, further comprising a detector provided at the robot adapted to generate at least one infrared signal and to detect a corresponding infrared signal from the charger, wherein the controller includes a distance and angle calculator configured to calculate at least one of a distance and an angle between the robot and the charger using the corresponding infrared signal detected by the detector.

14. A system as claimed in claim 13, wherein:

the detector includes at least first and second distance detection sensors, and the distance and angle calculator is adapted to calculate at least one of the distance and the angle between the robot and the charger using signals detected by at least one of the first and the second distance detection sensors.

15. A method for returning a robot to a charger, the method comprising:

detecting a return command signal at the robot;

traveling while searching to locate at least one of a first, a second, and a third infrared signal transmitted from a front side of the charger and a fourth infrared signal transmitted from opposite lateral sides of the charger;

receiving at least one of the at least first, second, third, and fourth infrared signals transmitted from the charger;

locating the charger based at least in part on the at least one of the first, second, third, and fourth infrared signals received from the charger;

traveling toward an area in front of the charger while searching for the third infrared signal when the at least one of the first, second, third, and fourth infrared signals received from the charger is not the third infrared signal; and docking at the charger when the third infrared signal is detected, thereby enabling the robot to charge.

16. A method as claimed in claim 15, wherein traveling includes traveling a predetermined interval while searching.

17. A method as claimed in claim 16, wherein traveling a predetermined interval while searching is performed iteratively until the third infrared signal is detected.

* * * * *